(12) United States Patent
Brown

(10) Patent No.: US 7,104,048 B2
(45) Date of Patent: Sep. 12, 2006

(54) LOW EMISSION DIESEL PARTICULATE FILTER (DPF) REGENERATION

(75) Inventor: David B. Brown, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/836,655

(22) Filed: Apr. 30, 2004

(65) Prior Publication Data
US 2005/0241299 A1 Nov. 3, 2005

(51) Int. Cl.
*F01N 3/00* (2006.01)

(52) U.S. Cl. .......................... 60/286; 60/274; 60/278; 60/280; 60/295; 60/297

(58) Field of Classification Search ................ 60/274, 60/278, 280, 286, 295, 297, 303, 311
See application file for complete search history.

(56) References Cited

U.S. PATENT DOCUMENTS

| | | | | |
|---|---|---|---|---|
| 5,711,149 A | * | 1/1998 | Araki | 60/278 |
| 5,802,846 A | * | 9/1998 | Bailey | 60/278 |
| 5,894,726 A | * | 4/1999 | Monnier | 60/274 |
| 5,987,884 A | * | 11/1999 | Kibe et al. | 60/286 |
| 6,141,959 A | * | 11/2000 | Digeser et al. | 60/274 |
| 6,276,130 B1 | * | 8/2001 | Ito et al. | 60/278 |
| 6,338,245 B1 | * | 1/2002 | Shimoda et al. | 60/285 |
| 6,438,948 B1 | * | 8/2002 | Ono et al. | 60/311 |
| 6,470,850 B1 | * | 10/2002 | Sasaki et al. | 123/305 |
| 6,490,857 B1 | * | 12/2002 | Sasaki | 60/278 |
| 6,594,990 B1 | * | 7/2003 | Kuenstler et al. | 60/295 |
| 6,708,487 B1 | * | 3/2004 | Morimoto et al. | 60/311 |
| 6,758,037 B1 | * | 7/2004 | Terada et al. | 60/295 |
| 6,813,880 B1 | * | 11/2004 | Nishiyama et al. | 60/278 |
| 6,817,174 B1 | * | 11/2004 | Igarashi et al. | 60/295 |
| 2004/0103654 A1 | * | 6/2004 | Ohtake et al. | 60/295 |
| 2006/0032213 A1 | * | 2/2006 | Woll et al. | 60/274 |

* cited by examiner

*Primary Examiner*—Tu M. Nguyen
(74) *Attorney, Agent, or Firm*—Christopher DeVries

(57) ABSTRACT

A diesel engine system includes a diesel engine having a first exhaust segment and a second exhaust segment. A filter filters exhaust gas from the first and second exhaust segments. A flow control valve selectively re-circulates a portion of exhaust from the first exhaust segment back into the diesel engine. An injector system injects fuel into exhaust flowing through the second exhaust segment. The fuel is combusted to regenerate the filter.

23 Claims, 4 Drawing Sheets

LOW EMISSION DIESEL PARTICULATE FILTER (DPF) REGENERATION

FIELD OF THE INVENTION

The present invention relates to diesel engines, and more particularly to diesel particulate filter (DPF) regeneration.

BACKGROUND OF THE INVENTION

Diesel engines have higher efficiency than gasoline engines due to the increased compression ratio of the diesel combustion process and the higher energy density of diesel fuel. As a result, a diesel engine provides improved gas mileage than an equivalently sized gasoline engine.

The diesel combustion cycle produces particulates that are typically filtered from the exhaust gases. A diesel particulate filter (DPF) is usually disposed along the exhaust stream to filter the diesel particulates from the exhaust. Over time, however, the DPF becomes full and must be regenerated to remove the trapped diesel particulates. During regeneration, the diesel particulates are burned within the DPF to enable the DPF to continue its filtering function.

One traditional regeneration method injects diesel fuel into the cylinder after the main combustion event. The post-combustion injected fuel is expelled from the engine with the exhaust gases and is combusted over catalysts placed in the exhaust stream. The heat released during the fuel combustion on the catalysts increases the exhaust temperature, which burns the trapped soot particles in the DPF. This approach utilizes the common rail fuel injection system and does not require additional fuel injection hardware.

Engine emissions are typically reduced by lowering cylinder temperatures, which occur when ignition timing is retarded. Retarding ignition timing, however, triggers the combustion process at a non-optimal point. As a result, engine efficiency, fuel economy and/or performance are reduced.

Exhaust gas recirculation (EGR) is another, more preferable method for reducing engine emissions. EGR involves re-circulating exhaust gases back into the cylinders, which limits the amount of oxygen available for combustion and lowers cylinder temperatures. EGR enables ignition timing to remain at an optimum point, which improves fuel economy and/or performance.

Traditionally, the EGR system must be disabled during DPF regeneration to prevent the post-injected fuel from being re-circulated into the engine. The re-circulation of the post injection fuel may damage the engine and/or the EGR system. Because the EGR system is disabled during DPF regeneration, the engine emission rates may increase during DPF regeneration.

SUMMARY OF THE INVENTION

Accordingly, the present invention provides a diesel engine system. The diesel engine system includes a diesel engine having a first exhaust segment and a second exhaust segment. A filter filters exhaust gas from the first and second exhaust segments. A flow control valve selectively re-circulates a portion of exhaust from the first exhaust segment back into the diesel engine. An injector system injects fuel into exhaust flowing through the second exhaust segment. The fuel is combusted to regenerate the filter.

In one feature, the diesel engine system further includes a catalyst that promotes combustion of the fuel.

In another feature, the diesel engine system further includes a turbo that is driven by the exhaust and that compresses air for combustion in the diesel engine.

In another feature, the flow control valve is controlled based on an engine load.

In another feature, the diesel engine system further includes an engine speed sensor that generates an engine speed signal. The engine load is determined based on the engine speed signal.

In still another feature, the engine load is based on a fueling rate of the diesel engine.

In yet another feature, the diesel engine system further includes a cooler that cools the re-circulated portion of the exhaust.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
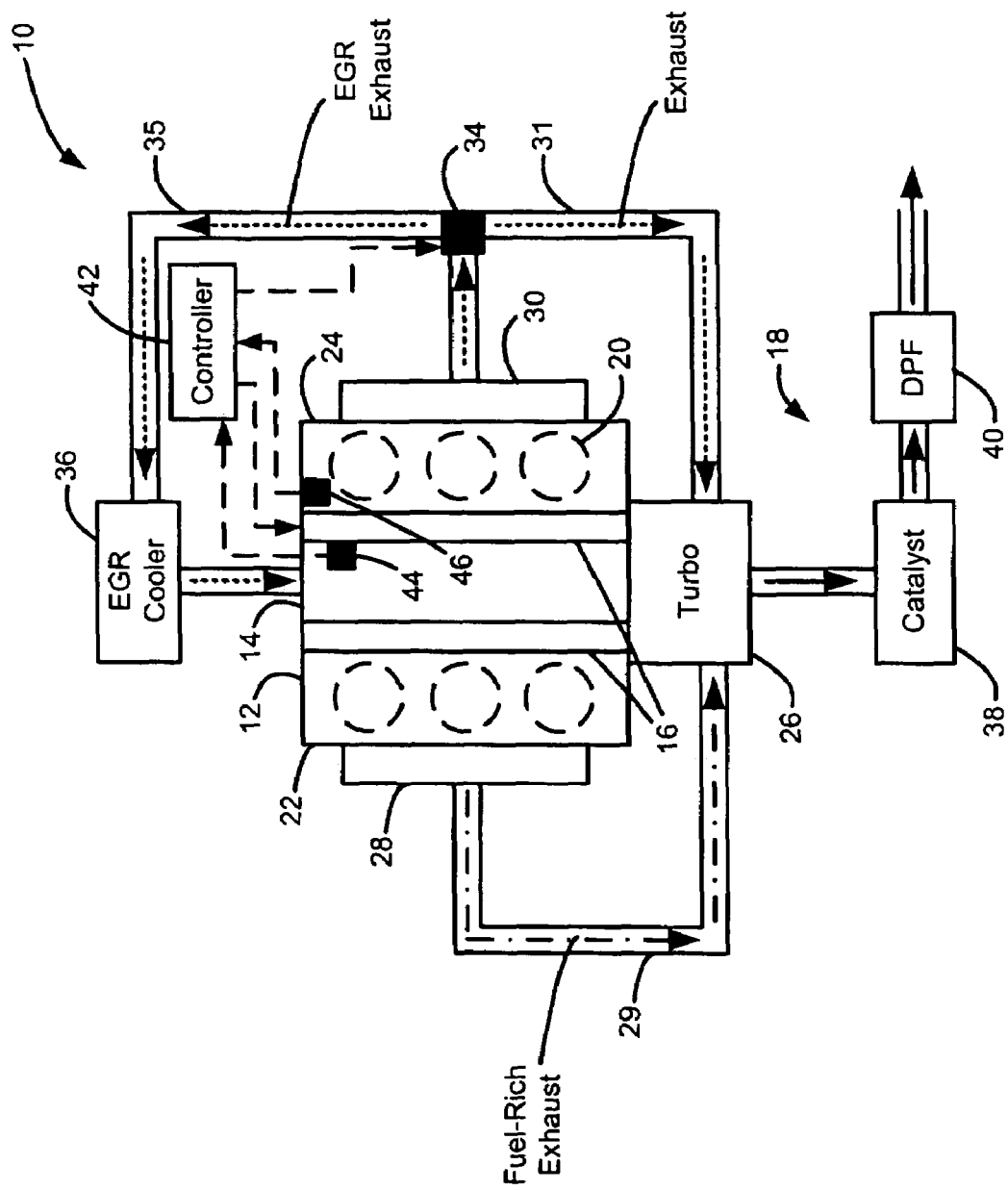
FIG. 1 is a schematic view of a diesel engine system of the present invention operating in a combined diesel particulate filter (DPF) regeneration and exhaust gas recirculation (EGR) mode.

The following description of the preferred embodiment is merely exemplary in nature and is in no way intended to limit the invention, its application, or uses. For purposes of clarity, the same reference numbers will be used in the drawings to identify similar elements. As used herein, the term exhaust gas recirculation (EGR) only mode refers to recirculation of exhaust gases for emissions control. The term combined diesel particulate filter (DPF) regeneration and EGR mode refers to operation including filter regeneration and EGR at the same time.

Figure 2:
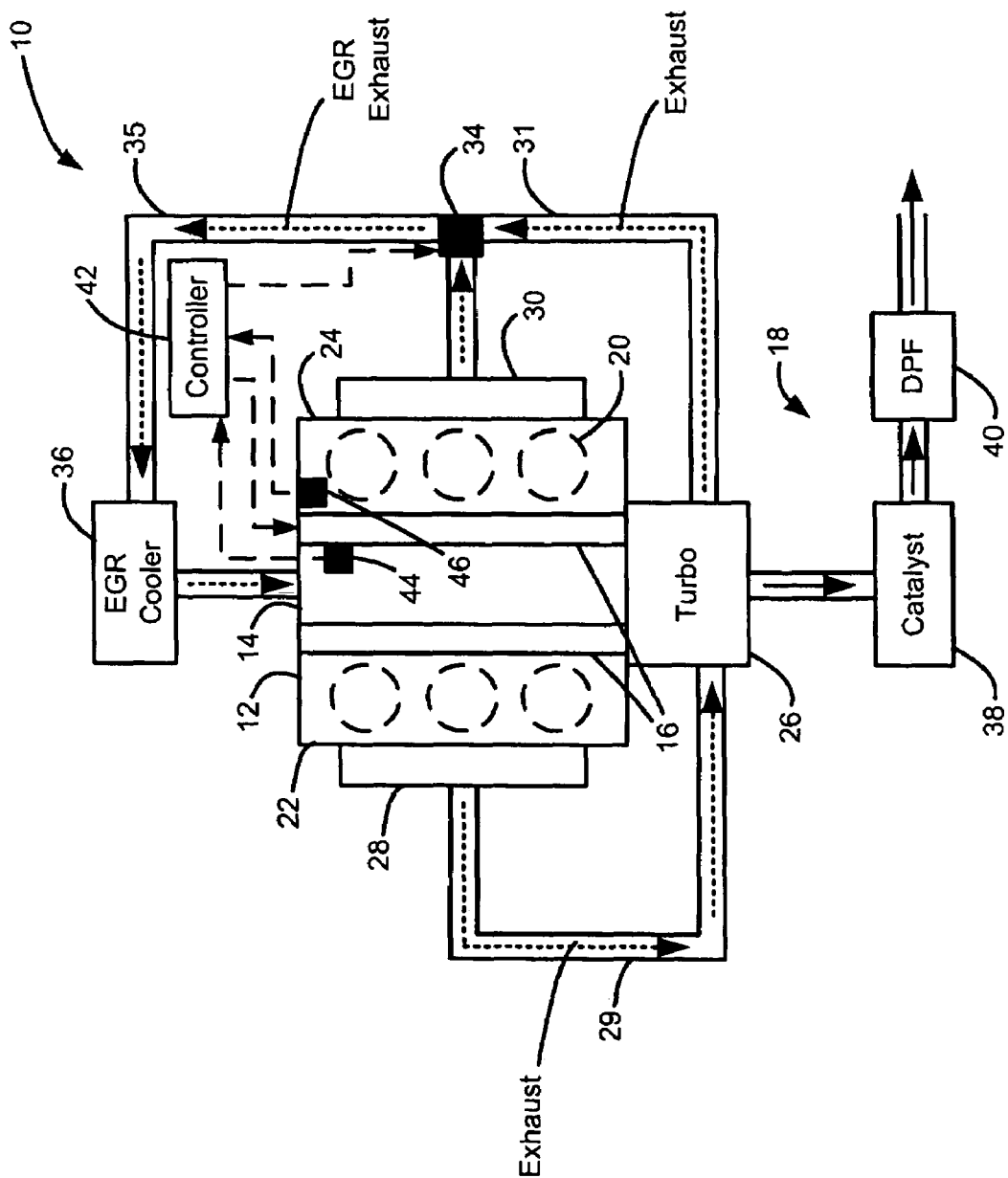
FIG. 2 is a schematic view of the diesel engine system of FIG. 1 operating in an EGR only mode.

Referring now to FIGS. 1 and 2, an exemplary diesel engine system 10 is schematically illustrated in accordance with the present invention. The diesel engine system 10 includes a diesel engine 12, an intake manifold 14, a common rail fuel injection system 16 and an exhaust system 18. The exemplary engine 12 includes six cylinders 20 configured in adjacent cylinder banks 22,24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the DPF regeneration control of the present invention can be implemented in an inline-type cylinder configuration, as discussed in further detail below.

Air is drawn into the intake manifold 14 through a throttle (not shown). Air is drawn into the cylinders 20 from the intake manifold 14 and is compressed therein. Fuel is injected into cylinder 20 by the common rail injection system 16 and the heat of the compressed air ignites the air/fuel mixture. The exhaust gases are exhausted from the cylinders 20 and into the exhaust system 18. In some instances, the diesel engine system 10 can include a turbo 26 that pumps additional air into the cylinders 20 for combustion with the fuel and air drawn in from the intake manifold 14.

The exhaust system 18 includes exhaust manifolds 28,30, exhaust conduits 29,31, an EGR valve 34, an EGR conduit 35, an EGR cooler 36, a catalyst 38 and a diesel particulate filter (DPF) 40. First and second exhaust segments are defined by the first and second cylinder banks 22,24. The exhaust manifolds 28,30 direct the exhaust segments from the corresponding cylinder banks 22,24 into the exhaust conduits 29,31. The EGR valve 34 re-circulates a portion of the exhaust through the EGR conduit 35, as explained in further detail below. The remainder of the exhaust is directed into the turbo 26 to drive the turbo 26. A combined exhaust stream flows from the turbo 26 through the catalyst 38 and the DPF 40. The DPF 40 filters particulates from the combined exhaust stream as it flows to the atmosphere.

A controller 42 regulates operation of the diesel engine system 10 according to the DPF regeneration control of the present invention. More particularly, the controller 42 communicates with an intake manifold absolute pressure (MAP) sensor 44 and an engine speed sensor 46. The MAP sensor 44 generates a signal indicating the air pressure within the intake manifold 14 and the engine speed sensor 46 generates a signal indicating engine speed (RPM). The controller 42 determines an engine load based on the RPM and fueling rates. The fueling rate is generally measured in fuel volume per combustion event. Engine output is controlled via the fueling rate.

The controller 42 determines an EGR rate based on engine load. For example, during periods of heavy engine load, the EGR rate is reduced to enable increased oxygen for combustion within the cylinders 20. During periods of low engine load, the EGR rate is increased to reduce oxygen intake into the cylinders 20, which reduces cylinder temperature and emissions. The EGR rate can vary from 0% to over 50%. More specifically, the EGR rate reflects the amount of re-circulated exhaust. For example, an EGR rate of 20% recirculates 20% of the total amount of exhaust generated.

The controller 42 controls the EGR valve 34 to achieve the desired EGR rate according to the DPF regeneration control of the present invention. A portion of the exhaust is re-circulated to the intake manifold 14 through the EGR cooler 36. The EGR cooler 36 cools the exhaust for combustion within the cylinders 20. The remaining portion of the exhaust is directed through the exhaust system 18 as discussed above.

DPF regeneration is initiated when the DPF is deemed full of particulates. The controller 42 continuously estimates the amount of emitted particulates since the last DPF regeneration based on engine operating parameters. DPF regeneration is preferably initiated during conditions requiring low EGR rates (e.g. less than 50%). For example, DPF regeneration is preferably initiated during cruising at highway speeds. DPF regeneration, however, can be initiated at less than optimum conditions if required. The duration of DPF regeneration varies based on the amount of estimated particulates within the DPF.

The DPF regeneration control of the present invention enables DPF regeneration and EGR at the same time. More particularly, the diesel engine system 10 is operable in a combined DPF regeneration and EGR mode (see FIG. 1) or an EGR only mode (see FIG. 2). The EGR only mode is implemented when DPF regeneration is not required. In the EGR only mode, the controller 42 controls the EGR valve 34 to achieve the desired EGR rate (i.e., 0% to >50%).

In the combined DPF regeneration and EGR mode, the controller 42 controls the common rail fuel injection system 16 to inject fuel into the first cylinder bank 22 immediately after combustion (i.e., post-injection) and controls the EGR valve 34 to achieve the desired EGR rate (i.e., 0% to 50%) by re-circulating the exhaust from the second cylinder bank 24. In this manner, EGR system and engine fouling issues are avoided. The EGR valve 34 associated with the second cylinder bank 24 regulates the EGR rate. If an EGR rate of greater than 50% is required, DPF regeneration is prohibited and the EGR valve 34 is controlled to achieve the desired EGR rate (i.e., >50%). In this case, exhaust from the first cylinder bank 22 travels through the conduits 29,31 and is available for recirculation to the engine 12.

Figure 3:
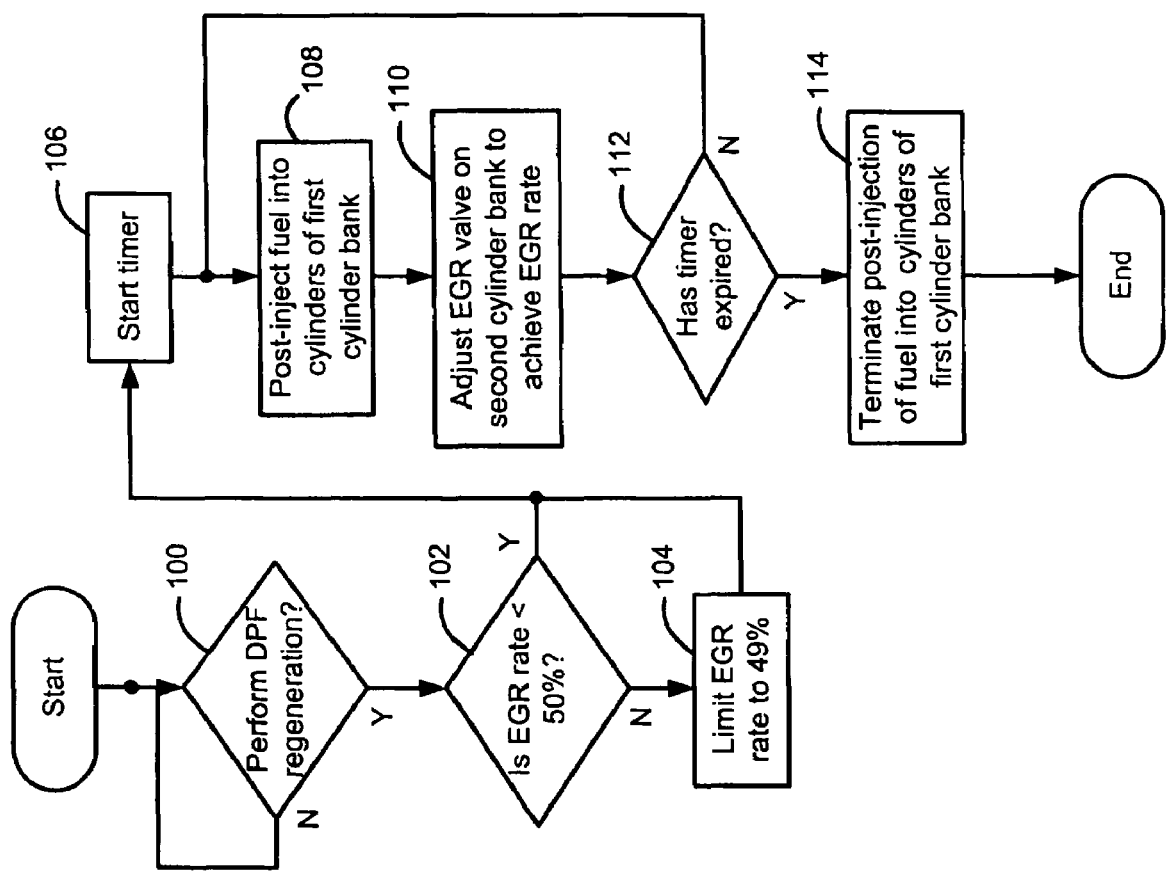
FIG. 3 is a flowchart illustrating the diesel particulate filter (DPF) regeneration control of the present invention.

Referring now to FIG. 3, the DPF regeneration control will be described in further detail. In step 100, control determines whether DPF regeneration is to be performed. If DPF regeneration is to be performed, control continues in step 102. If DPF regeneration is not to be performed, control loops back. In step 102, control determines whether the desired EGR rate is less than 50%. If the desired EGR rate is not less than 50%, control continues in step 104 and limits the EGR rate to 49%. If the desired EGR rate is less than 50%, control continues in step 106.

In step 106, control starts a timer. The timer regulates the duration of the DPF regeneration and is based on the estimated amount of particulates within the DPF. Control post-injects fuel into the cylinders 20 of the first cylinder bank 22 immediately after the previous combustion cycle in step 108. The post-injected fuel mixes with the exhaust within the cylinders 20 and is pushed out of the cylinders 20 into the exhaust system 18. The fuel-rich exhaust flows through the turbo 26 and is combusted in the catalyst 38. The combustion within the catalyst 38 increases the temperature of the exhaust that flows through the DPF 40. The high temperature exhaust causes the particulates within the DPF 40 to burn, regenerating the DPF 40.

In step 110, control adjusts the EGR valve 34 to achieve the desired EGR rate. Because no fuel is injected into the exhaust generated in the second cylinder bank 24, fuel is not re-circulated back into the intake manifold 14. The portion of second cylinder bank exhaust that is not re-circulated flows through the turbo 26 and out the exhaust system 18 as described above.

Control determines whether the timer has expired in step 112. If the timer has expired, control continues in step 114. If the timer has not expired, control loops back to step 108. In step 114, control terminates post-injection of fuel into the cylinders 20 of the first cylinder bank 22 and control ends.

Figure 4:
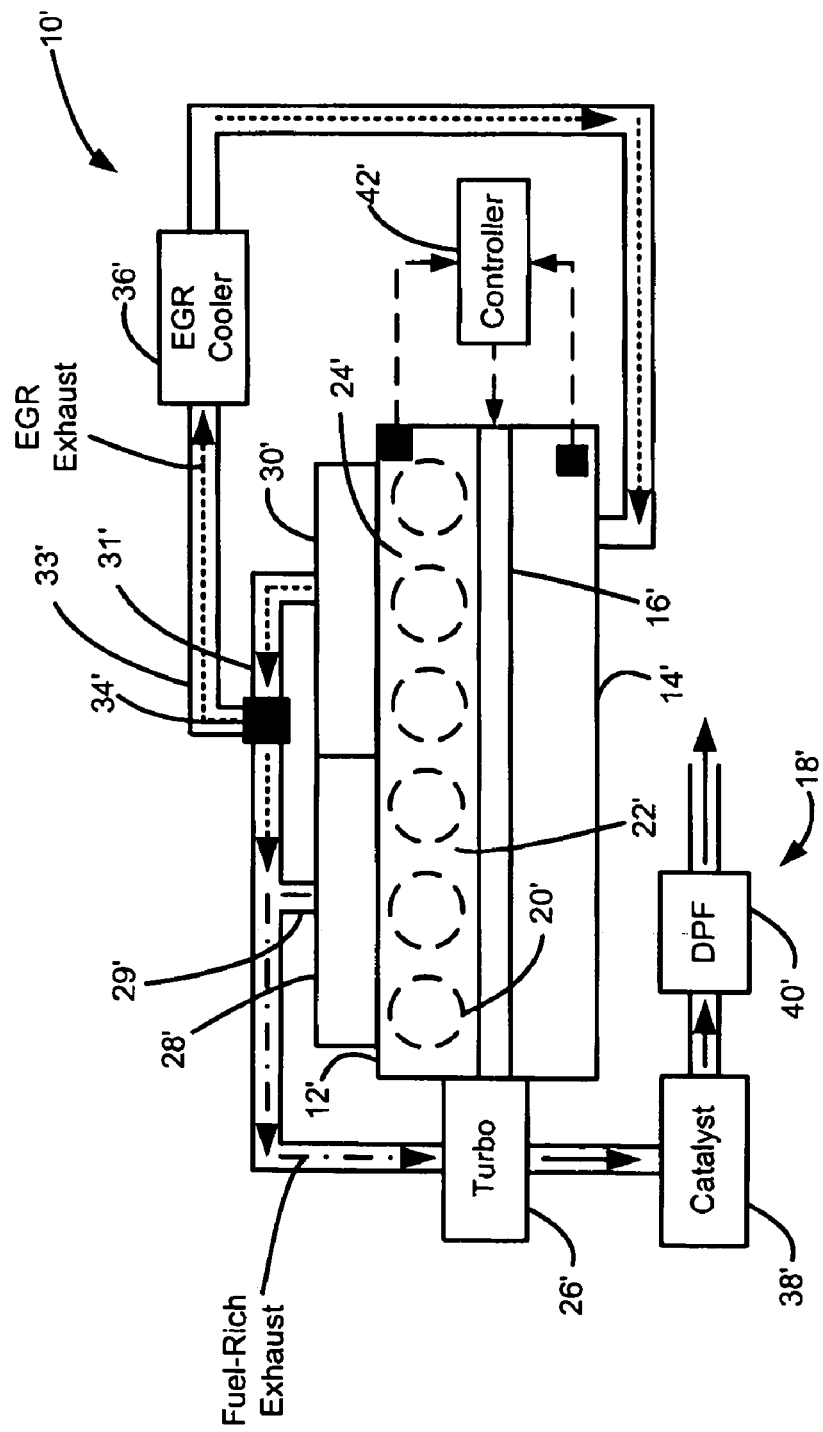
FIG. 4 is a schematic view of an inline configured diesel engine system operating in the combined DPF regeneration and EGR mode.

Referring now to FIG. 4, an exemplary inline configured diesel engine system 10' is illustrated. The inline configured diesel engine system 10' includes an engine 12', an intake manifold 14', a common rail fuel injection system 16' and an exhaust system 18'. The exemplary engine 12' includes six cylinders 20' configured in adjacent cylinder banks 22',24' in an inline-type layout. Although FIG. 4 depicts six cylinders (N=6), it can be appreciated that the engine 12' may include additional or fewer cylinders 20. For example, engines having 2, 4, 5, 8, 10, 12 and 16 cylinders are contemplated.

Air is drawn into the intake manifold 14' through a throttle (not shown). Air is drawn into the cylinders 20' from the intake manifold 14' and is compressed therein. Fuel is injected into cylinders 20' by the common rail injection system 16' and the heat of the compressed air ignites the air/fuel mixture. The first and second exhaust segments are exhausted from the corresponding cylinder banks 22',24' and into the exhaust system 18'. In some instances, the diesel engine system 10' can include a turbo 26' that pumps additional air into the cylinders 20' for combustion with the fuel and air drawn in from the intake manifold 14'.

The exhaust system 18' includes exhaust manifolds 28', 30', an EGR valve 34', an EGR cooler 36', a catalyst 38' and a DPF 40'. First and second exhaust segments are defined by the first and second cylinder banks 22',24'. The exhaust manifolds 28',30' direct the exhaust segments from the corresponding cylinder banks 22',24' into exhaust conduits 29',31'. The EGR valve 34' selectively re-circulates a portion of the combined exhaust streams through an EGR conduit 33', as discussed in detail above. The combined exhaust streams are directed into the turbo 26' to drive the turbo 26'. The combined exhaust stream flows from the turbo 26' through the catalyst 38' and the DPF 40'. The DPF 40' filters particulates from the combined exhaust stream as it flows to the atmosphere.

A controller 42' regulates operation of the diesel engine system 10' according to the DPF regeneration control discussed in detail above. The controller 42' determines the EGR rate based on engine load. The controller 42' controls the EGR valve 34' to achieve the desired EGR rate according to the DPF regeneration control. A portion of the exhaust is re-circulated to the intake manifold 14' through the EGR cooler 36'. The EGR cooler 36' cools the exhaust gas for combustion within the cylinders 20'. The remaining portion of the exhaust gas is directed through the exhaust system as discussed above.

In the combined DPF regeneration and EGR mode, the EGR valve 34' is operated to re-circulate a portion of the exhaust from the second cylinder group 24' to achieve the desired EGR rate (i.e., 0% up to 50%). In this manner, concurrent EGR and DPF regeneration are enabled and fuel-rich exhaust is prohibited from re-circulating back into the engine 12'.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of operating a diesel engine, comprising:
    dividing exhaust gas generated by said diesel engine into first and second exhaust segments that respectively channel exhaust gas from first and second cylinder banks;
    redirecting at least a portion of said first exhaust segment into cylinders of said diesel engine and inhibiting re-circulation of exhaust from said second exhaust segment during a first mode;
    redirecting a portion of exhaust from each of said first and second exhaust segments back into said diesel engine during a second mode;
    injecting fuel into said second exhaust segment during a first mode;
    directing said second exhaust segment and a remainder of said first exhaust segment to a particulate filter during said first mode; and
    combusting said fuel to burn particulates trapped within a particulate filter.

2. The method of claim 1 further comprising cooling said portion of said first exhaust segment.

3. The method of claim 1 further comprising driving a turbo unit using said second exhaust segment and said remainder of said first exhaust segment.

4. The method of claim 1 further comprising initiating combustion of said fuel using a catalyst.

5. The method of claim 1 further comprising calculating an engine load, wherein a volume of said portion of said first exhaust segment is determined based on said engine load.

6. The method of claim 5 further comprising detecting a fueling rate, wherein said engine load is based on said fueling rate.

7. The method of claim 5 further comprising detecting an engine speed, wherein said engine load is based on said engine speed.

8. A method of operating a diesel engine, comprising:
    calculating an exhaust re-circulation value;
    redirecting at least a portion of a first exhaust segment generated by said diesel engine into cylinders of said diesel engine to achieve said exhaust re-circulation value and inhibiting re-circulation of said second exhaust segment when said exhaust re-circulation value is below a threshold value during a first mode;
    redirecting a portion of each of said first and second exhaust segments back into said diesel engine during a second mode;
    injecting fuel into a second exhaust segment generated by said diesel engine when said exhaust re-circulation value is below said threshold value during said first mode;
    directing said second exhaust segment and a remainder of said first exhaust segment to a particulate filter during said first mode; and
    combusting said fuel to burn particulates trapped within a particulate filter.

9. The method of claim 8 wherein said threshold value is equal to 50% of a total amount of exhaust generated by said diesel engine.

10. The method of claim 8 further comprising prohibiting said step of injecting fuel when said exhaust re-circulation value is above said threshold value.

11. The method of claim 8 further comprising cooling said portion of said first exhaust segment.

12. The method of claim 8 further comprising driving a turbo unit using said second exhaust segment and said remainder of said first exhaust segment.

13. The method of claim 8 further comprising initiating combustion of said fuel using a catalyst.

14. The method of claim 8 further comprising calculating an engine load, wherein said exhaust re-circulation value is determined based on said engine load.

15. The method of claim 14 further comprising detecting a fueling rate, wherein said engine load is based on said fueling rate.

16. The method of claim 14 further comprising detecting an engine speed, wherein said engine load is based on said engine speed.

17. A diesel engine system, comprising:
- a diesel engine having a first exhaust segment that channels exhaust gas from a first cylinder bank and a second exhaust segment that channels exhaust gas from a second cylinder bank;
- a filter that filters exhaust gas from said first and second exhaust segments;
- a flow control valve that selectively re-circulates a portion of exhaust from said first exhaust segment back into said diesel engine and inhibits re-circulation of exhaust from said second exhaust segment during a first mode and that re-circulates a portion of exhaust from each of said first and second exhaust segments back into said diesel engine during a second mode; and
- an injector system that injects fuel into exhaust flowing through said second exhaust segment during said first mode, wherein said fuel is combusted to regenerate said filter.

18. The diesel engine system of claim 17 further comprising a catalyst that promotes combustion of said fuel.

19. The diesel engine system of claim 17 further comprising a turbo that is driven by said exhaust and that compresses air for combustion in said diesel engine.

20. The diesel engine system of claim 17 further comprising a cooler that cools said re-circulated portion of said exhaust.

21. The diesel engine system of claim 17 wherein said flow control valve is controlled based on an engine load.

22. The diesel engine system of claim 21 further comprising an engine speed sensor that generates an engine speed signal, wherein said engine load is determined based on said engine speed signal.

23. The diesel engine system of claim 21 wherein said engine load is based on a fueling rate of said diesel engine.

* * * * *